Feb. 29, 1944.   J. P. GRUNDON ET AL   2,342,934
HAY BUCK AND STACKER
Filed March 25, 1943   2 Sheets-Sheet 1

Inventors
John P. Grundon
John H. Rogers
by Alfred G. Hagues Atty

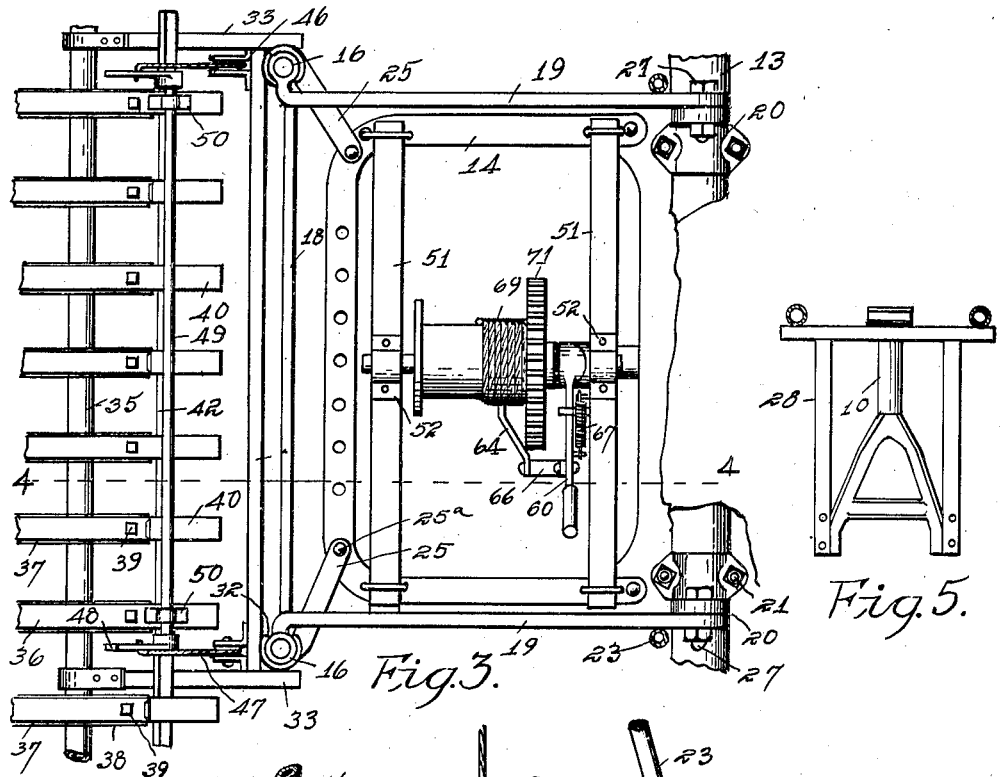
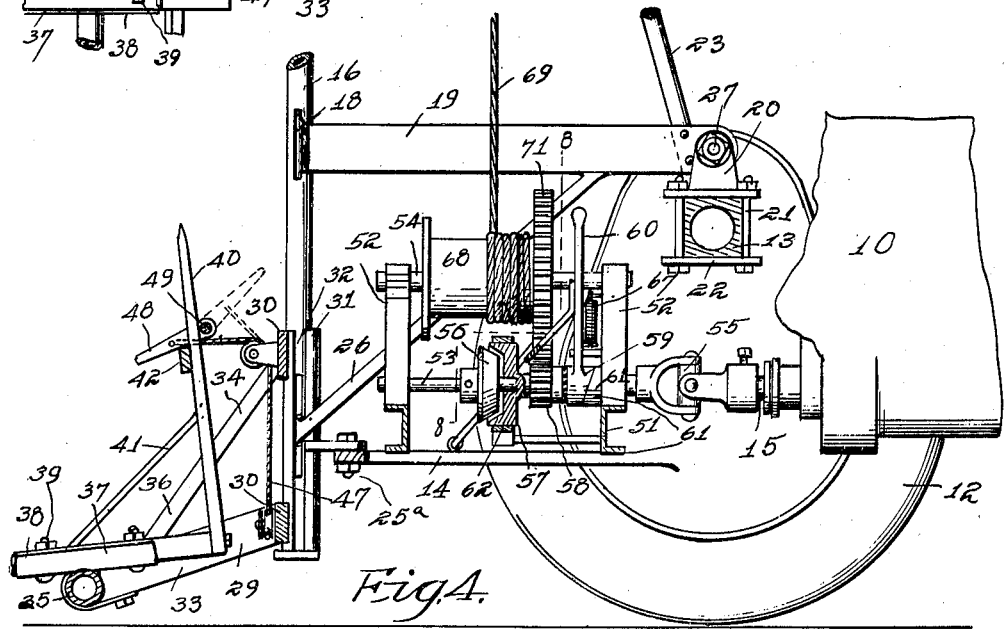

Patented Feb. 29, 1944

2,342,934

UNITED STATES PATENT OFFICE 2,342,934

HAY BUCK AND STACKER

John P. Grundon and John H. Rogers,
Fort Dodge, Iowa

Application March 25, 1943, Serial No. 480,486

7 Claims. (Cl. 214—113)

This invention relates to improvements in hay bucks and stackers of that type adapted to be supported by a farm tractor and to derive its power for elevating and lowering the buck therefrom. We are well aware that a large number of hay buck and stacker devices have been patented and placed on the market which are attached to a tractor and derive their power therefrom. Insofar as we are aware, all of these devices are connected to and supported by the forward end of the tractor. This arrangement is objectionable in several ways. First, in that usually the forward end of the tractor is carried by one or two wheels. If two wheels are used they are placed close together so as to permit them to be advanced between two rows of crops, such as corn or cotton, and even if the front wheels are placed farther apart, the ordinary tractor is supported on what is commonly called a three point suspension or support, the hind or traction wheels being spaced apart a considerable distance, while the front end of the tractor is suspended either by a single pivot member or by the one or two wheel idea first mentioned. This results in providing a very unstable support against lateral swinging movement of any stacker carried by the front end of the tractor, this being particularly true when the load is in its elevated position.

Another difficulty experienced in a large number of stacker arrangements attached to the forward end of the tractor lies in the fore and aft overhang wherein the axles of the front wheels serve as a fulcrum on which the load as it is elevated is counterbalanced by the back end of the tractor. This fulcrum, which is the main support for the entire load, is itself deprived of any lateral stability due to the narrow tread of the front wheels. Furthermore, a considerable amount of mechanism is necessary to produce the means for elevating the load, in view of the fact that the load is at the front end of the tractor while the power is usually derived from the rear end of the tractor.

It is, therefore, the object of our invention to provide an improved hay buck and stacker arrangement to be applied to a tractor in such a manner as to overcome the objectionable features above stated, the lateral instability of the upper end of the stacker frame being overcome by supporting the entire frame on the rear end of the tractor with the frame in an upright position and fixed thereto in such a manner that the lateral swinging tendency of the upper end of the frame will be carried by the widely spaced traction wheels. By supporting the stacker frame on the rear end of the tractor the power mechanism for elevating and lowering the hay buck may be supported adjacent to the power take-off shaft.

A further object of our invention is to provide in a hay buck and stacker of the type having an upright frame and carriage slidably mounted thereon to move vertically and a hay buck carried by said carriage, improved means for connecting the hay buck to the carriage, with the buck pivotally mounted thereon to permit the tines to follow the contour of the ground surface as the buck is advanced, and in connection therewith, improved means for elevating the free ends of the tines and for locking them in elevated position and for unlocking them to permit them to swing to dumping position after the buck rake has been elevated.

A further object is to provide in a hay buck and stacker of the type employing an upright stacker frame carried by the tractor, improved means for mounting the stacker frame to the tractor wherein it may be easily and quickly attached or detached and wherein the said frame may be folded or swung to a substantially horizontal position above the tractor for transportation to and from the field, and to permit the frame to be passed beneath telephone wires, electric light wires and other overhead obstructions, to thereby permit a frame of greater height to be used than would otherwise be possible.

Our invention consists in the construction, arrangement and combination of the various parts of the device, whereby the objects contemplated are attained, as hereinafter more fully set forth, pointed out in our claims, and illustrated in the accompanying drawings, in which:

Figure 3 is an enlarged detail segmental plan view showing the rear end of the buck rake and a portion of the tractor axle and the draw bar connected thereto, and the manner in which our improved stacker frame is connected thereto;

Figure 4 is a detail sectional view taken on the line 4—4 of Figure 3, a portion of the friction drum being broken away;

Figure 5 is a detail view of the bracket for supporting the stacker frame when in its horizontal or folded position;

Figure 6:
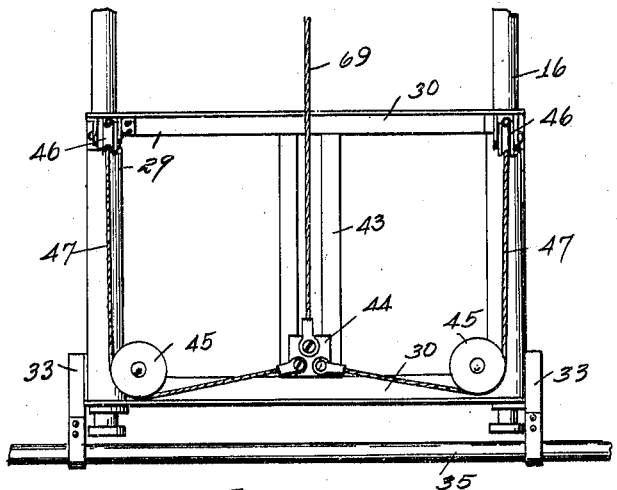
Figure 6 is a front view of the lower end of the stacker frame and the buck-supporting carriage, with the buck teeth removed.
Figure 7:
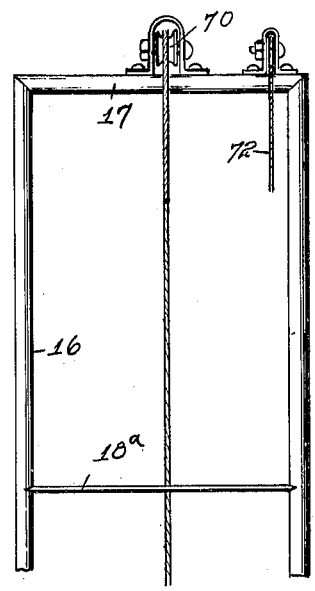
Figure 7 is a front elevation of the upper end of the stacker frame.

The numeral 10 indicates a farm tractor of ordinary construction having steering wheels 11 and traction wheels 12, the rear end of the tractor being provided with the usual axle 13 and a draw bar 14, the tractor also being provided with a power take-off shaft 15 of ordinary construction.

Our improved stacker comprises upright members 16, preferably of tubular formation, having a cross beam 17 at their upper ends, and reinforcing stays 18a. A transversely arranged cross member 18 is provided near the lower ends of the uprights 16. Projecting rearwardly from each end of the members 18 is a supporting bar 19, the rear ends of the said bars 19 being pivotally connected to the axle 13 by means of brackets 20 which are clamped to the axle by means of bolts 21 and a clamping plate 22. Projecting upwardly and forwardly from the rear end of each of the members 19 are brace rods 23, said rods extending to the upper end of the frame member 16. Braces 24 are provided between the members 16 and 23.

Near the lower end of each of the members 16 is a bracket 25 having its free end fixed to and supported by the draw bar 14. A brace member 26 connects the lower ends of the members 16 to the rear ends of the members 19 so that the members 19 and said brace 26 provide rigid supports for the uprights 16, together with the members 23 forming a rigid frame construction which may be swung to a horizontal position by simply loosening the bolts 25a, allowing the frame member to swing about the bolts 27 pivoting the members 19 to the members 20. The forward end of the frame thus supported is carried by a bracket 28 supported by the front end of the tractor, as clearly illustrated in Figure 5.

For supporting the buck rake we have provided what we shall term a carriage 29, comprising cross members 30 supported by guides 31 which are slidably mounted on the members 16, said guides 31 only partially surrounding the members 16 to provide a space 32 between the edges of said guides to permit the guides to move upwardly and downwardly past the brace members 18a and 24 and also past the members 19 and 25 and the cross member 18 as the said members are elevated and lowered. The lower cross member 30 of the carriage is provided with downwardly and forwardly extending arms 33 having braces 34 for fixing the said arms to the members 31. The forward ends of the members 33 rotatably support a tubular member 35 which provides a support for the teeth 36 of the buck rake, the said teeth being supported to said member 35 by means of brackets 37 which are welded to the tubular member 35, said brackets including side members 38 between which the teeth 36 are supported, the teeth being secured to said brackets by bolts 39. The rear end of each alternate tooth 36 is provided with an upright retainer tooth 40, the end one of the members 40 being provided with braces 41 to assist in anchoring the same against forward and rearward movement. A cross bar 42 is provided and secured to all of the upright members 40, thereby providing a stiff frame for preventing material from being crowded to position between the upright members 16 as the load is moved in position thereon. By this construction it will be seen that the buck rake, comprising the tines 36 and the uprights 40, constitute a rake which is pivotally supported by the members 33 so that the forward ends of the members 36 may be raised and lowered to permit the teeth to follow the uneven ground surface as the buck is being loaded, and also to permit the said teeth to be swung downwardly for dumping purposes.

The cross members 30 are provided at their central portions with vertically arranged guide devices 43 in which is slidably mounted what we shall term a lift head 44. The ends of the lower member 30 are also provided with pulleys 45, while the ends of the upper member 30 are provided with pulleys 46. Cables 47 are connected to the lift head 44, then threaded over the corresponding pulleys 45 and 46 and have their ends connected to lever arms 48, said arms being mounted on the corresponding ends of a rock shaft 49 pivotally supported in bearings 50 carried by the rear faces of two of the members 40.

Assuming that the head 44 is at its lower limit of movement and that the lever arms 48 are moved forwardly from the dotted line position to the solid line position, then it will be seen that the members 40 will be moved rearwardly toward the member 16, causing the forward ends of the tines 36 to be elevated, these levers being moved forwardly to position to engage the cross member 42 with the cable 47 below the ends of the shaft 49, or what is commonly known as past dead center. This provides means for dumping the carriage in the manner hereinafter more fully set forth.

For elevating and lowering the carriage we have supported on the draw bar 14 a pair of transversely arranged frame members 51 having at their central portions upright supports 52 in which are mounted horizontal shafts 53 and 54, the shaft 53 being operatively connected directly to the power take-off shaft 15 by a universal joint 55, said shaft 53 having a friction cone 56 fixed thereto adapted to cooperate with a conical shell 57 which is rotatably and slidably mounted on said shaft and to which is fixed a pinion gear 58. A clutch device 59 is provided for causing the member 57 to frictionally engage the member 56 by means of a lever 60, downward movement of the free end of said lever causing the clutch member 59 to rotate relative to the clutch member 61 fixed to the member 52, and in turn move the shell 57 into engagement with the cone 56. The outer face of the shell 57 is provided with a brake band 62 having one end mounted on a pin 63 and its opposite end fixed to the lever 64, which in turn is carried by a pin 65 mounted in the support 52. A link 66 connects the free end of the lever 64 with the lever 60 in such a manner that as the free end of the lever 60 is lowered, the brake band will be released. A spring 67 provides means for elevating the lever 60 and for applying tension to said brake band.

Supported on the shaft 54 is a cable drum 68 supporting a cable 69 which passes over a pulley 70 carried by the frame member 17, thence downwardly to the lift head 44, the drum 68 having a gear 71 in mesh with the pinion 58. Thus, it will be seen that means is provided for elevating the carriage, the shell member 57 being normally out of engagement with the cone 56, so that the cone rotates continuously. The lever 60 may be lowered, if so desired, causing the shell 57 to engage the cone 56 and simultaneously releasing the band 62. The drum 68 is thereby rotated, causing the lift head 44 to be elevated relative to the guides 43, which in turn causes tension to be applied to the cables 47, causing the members 40 to be moved toward the member 16 until the tines 36 are substantially in a horizontal position, at which time the lift head 44 will engage the upper bar 30, after which the carriage 29 will be elevated. When the load has reached the desired elevated position the free ends of the levers 48 are swung upwardly by means of a trip rope 72 attached to one of said levers; the opposite end of said rope is fastened near the operator of the tractor. The carriage is held in its elevated position by the brake band 62. The carriage may be permitted to lower by gravity by slightly lowering the lever 60 to partially release the band 62 from the drum 57, with the drum 57 slightly in engagement with the member 56.

In loading the buck the lever 48 is moved from the tripped dotted line position to its solid line loading position, with the free ends of the tines engaging the ground surface. The tractor is then operated in a reverse direction until the buck has been loaded, after which the lever 60 is lowered to elevate the forward ends of the tines and to elevate the carriage to any predetermined amount, preferably one or two feet above the ground surface, after which the load may then be carried to the stack with the tractor still operating in reverse, the brake band 62 holding the load in the said elevated position.

In moving from the stack to the field the buck may be lowered with the teeth riding the ground surface, at which time the tractor is operated in its forward direction, in high gear, allowing the teeth to drag on the ground surface, thereby relieving the free ends of the teeth of the buck from the up and down whipping tendency that would be encountered if the buck were supported above the ground surface and the tractor traveling at high speed over rough ground, thus relieving the carriage and teeth of undesired strains.

Figures 2, 8:
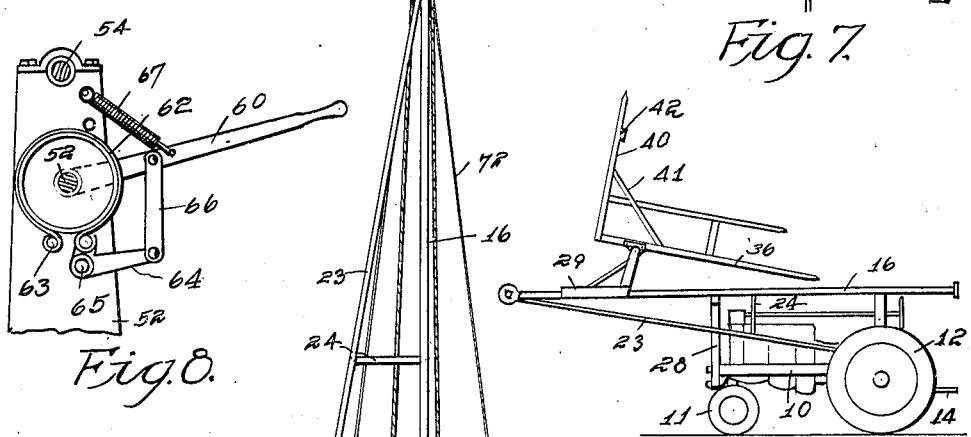
Figure 2 is a diagrammatical view showing the manner in which the stacker frame may be folded to position above the tractor for transportation from one point to another.
Figure 8 is a sectional view taken on the line 8—8 of Figure 4.
Figure 1:
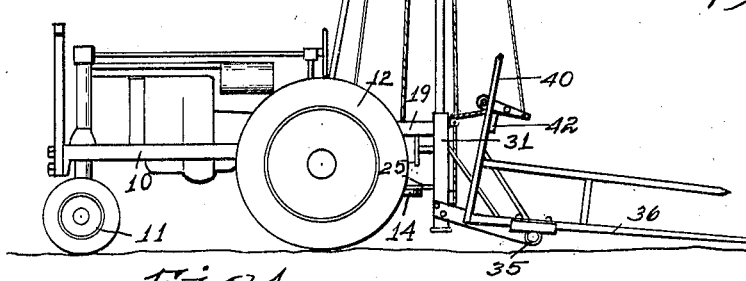
Figure 1 is a side elevation of a farm tractor showing the manner in which our improved hay buck and stacker is mounted thereon, with the stacker frame in an upright operative position.

Thus it will be seen we have provided a hay buck and stacker of comparatively simple construction attached to the back end of a tractor so as to increase the lateral stability of the upright supporting frame and wherein the load will be comparatively close to the tractor wherein any great amount of overhanging leverage is eliminated tending to lift the opposite end of the tractor. It will further be seen that by pivoting the stacker frame to the tractor whereby it will fold to horizontal position when being transported from one position to another, a comparatively high stacker frame may be employed so that high stacks may be built and at the same time permit the stacker to be transported from one field to another and under over-head obstructions. When the stacker frame is moved to its horizontal position the carriage and the buck frame may be moved towards the forward end, as illustrated in Figure 2, or the said carriage and buck frame may be disconnected from the stacker frame if so desired.

We claim as our invention:

1. The combination of a tractor having an axle, a draw bar and a power take-off shaft, an upright stacker frame supported near the draw bar, supporting arms projecting forwardly from said frame to points above said axle, means detachably connected to said axle for pivotally connecting said frame to said axle, means detachably connecting the lower end of said upright frame to said draw bar, a rake-supporting carriage mounted to slide vertically on said upright frame, the lower end of said carriage having downwardly and forwardly extending rake-supporting arms, a rake-supporting bar pivoted transversely in said arms, rake teeth fixed to said bar including upright retaining teeth at their rear ends, a rock shaft supported by said retaining teeth, a lever arm fixed to each end of said rock shaft, a lift head slidably mounted in said carriage, a cable operatively connecting each lever arm to said lift head, a cable drum carried by said draw bar, means operatively connecting said drum to said power take-off shaft, and a lift cable connecting said lift head to said drum.

2. A buck rake and stacker, comprising an upright frame, a carriage mounted to move vertically on said frame, a buck rake having upright supports at its rear end, means pivotally supporting said rake adjacent its rear end on said carriage, a rock shaft rotatably mounted on said upright supports, a pair of lever arms mounted on said shaft in an axially spaced relation, stop means on said upright supports normally in engagement with said lever arms, a lift head vertically movable on said carriage, a cable operatively connecting each lever arm to said lift head, and means for elevating said lift head, with said cables, on elevation of said lift head, pulling said lever arms against said stop means to pivot the forward end of said rake upwardly and rearwardly.

3. A buck rake and stacker including a main frame, a carriage vertically movable on said main frame, a buck rake pivotally supported on said carriage, upright supporting means adjacent the rear end of said rake, lever means pivoted on said supporting means, stop means on said supporting means, with said lever means being normally in a supported position on said stop means, a lift head vertically movable on said carriage to a stop position, a cable operatively connecting said lever means to said lift head, with said cable being below the level of the pivot for said lever means, means for elevating said lift head, said cable, on elevation of said lift head to said stop position, pulling said lever means against said stop means to swing the forward end of said rake upwardly, and means, when the carriage is in such stop position, for pivoting said lever means upwardly out of engagement with said stop means to trip said rake.

4. The combination of a tractor having a rear axle and a draw bar, a stacker frame at the rear end of said tractor having upright frame members, means providing for the pivotal movement of said stacker frame to a normal upright position at the rear end of the tractor and to a substantially horizontal carrying position above said tractor, including a pair of frame members projected laterally from said upright members to said rear axle, means pivotally connecting the free ends of said lateral frame members to said rear axle, and means for detachably connecting said upright members to said draw bar when said stacker frame is in an upright position.

5. In a hay buck and stacker adapted to be carried on a tractor, a main frame having a pair of uprights, a vertically movable carriage including a pair of sleeve members corresponding to said uprights, with each sleeve member being movably mounted on an upright and having a slot therein extended axially over its complete length, transverse connecting members between said uprights, supporting members on said uprights spaced from said connecting members, and means for connecting said supporting members with said tractor, with the portions of said connecting members and supporting members adjacent each upright being in alignment longitudinally of said upright and receivable in the slot of the sleeve member corresponding to said upright to provide for a free movement of said carriage on said uprights.

6. In a buck rake and stacker including an upright frame, a carriage vertically movable on said upright frame, supporting arms adjacent the bottom of said carriage and extended forwardly therefrom, a buck rake including a member rotatably supported in the forward ends of said arms, channel members mounted in a spaced relation axially of said rotatable member and with their bottoms adjacent said rotatable member, a tooth member receivable in each channel member, and means for detachably securing a tooth member in a corresponding channel member.

7. In a buck rake, a supporting member extended from side to side of said buck rake adjacent the bottom of said buck rake, a plurality of channel members mounted on said supporting member and arranged transversely of said supporting member with their bottoms adjacent the top of said supporting member, a tooth member receivable in each channel member, and means for detachably connecting a tooth member with a corresponding channel member.

JOHN P. GRUNDON.
JOHN H. ROGERS.